(12) United States Patent
Nandagopal et al.

(10) Patent No.: US 7,835,304 B2
(45) Date of Patent: Nov. 16, 2010

(54) METHOD AND APPARATUS FOR ASSIGNING IP ADDRESSES

(75) Inventors: Thyagarajan Nandagopal, Edison, NJ (US); Thomas Y. Woo, Short Hills, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 203 days.

(21) Appl. No.: 11/946,307

(22) Filed: Nov. 28, 2007

(65) Prior Publication Data

US 2009/0135816 A1   May 28, 2009

(51) Int. Cl.
*H04L 12/28* (2006.01)

(52) U.S. Cl. ..................................................... 370/254

(58) Field of Classification Search ................. None
See application file for complete search history.

(56) References Cited

U.S. PATENT DOCUMENTS

| | | | | |
|---|---|---|---|---|
| 6,295,594 B1* | 9/2001 | Meier | .......................... | 711/171 |
| 6,662,287 B1* | 12/2003 | Andreev et al. | ............. | 711/170 |
| 7,051,056 B2* | 5/2006 | Rodriguez-Rivera et al. | ..... | 707/206 |
| 7,330,907 B2* | 2/2008 | Boylan et al. | ................ | 709/245 |
| 2002/0144073 A1* | 10/2002 | Trainin et al. | ................ | 711/170 |
| 2003/0163620 A1* | 8/2003 | Minami et al. | ................. | 710/62 |
| 2007/0180120 A1* | 8/2007 | Bainbridge et al. | .......... | 709/226 |
| 2007/0230468 A1* | 10/2007 | Narayanan et al. | .......... | 370/392 |
| 2008/0159289 A1* | 7/2008 | Narayanan et al. | .......... | 370/392 |
| 2008/0259933 A1* | 10/2008 | Okada et al. | ............ | 370/395.31 |
| 2009/0006596 A1* | 1/2009 | Dinakaran et al. | .......... | 709/223 |

FOREIGN PATENT DOCUMENTS

WO   WO 2009/078028 A1   6/2009

* cited by examiner

*Primary Examiner*—Chirag G Shah
*Assistant Examiner*—Amarnauth Persaud
(74) *Attorney, Agent, or Firm*—Wall & Tong, LLP (57) ABSTRACT

The invention includes a method and apparatus for assigning an IP address to a mobile node (MN) from an IP address space represented using an address aggregation tree. A method includes receiving a request for an IP address for the MN, identifying each of a plurality of sub-tree gaps in the address aggregation tree, selecting one of the identified sub-tree gaps, and assigning an available IP address from the selected sub-tree gap to the MN. The sub-tree gaps of the address aggregation tree are identified using a recursive algorithm that traverses the address aggregation tree. The selected one of the sub-tree gaps is selected based on respective sizes of the identified sub-tree gaps. The assigned IP address is communicated to the MN for use by the MN in accessing various services.

15 Claims, 8 Drawing Sheets

| IP Address/Prefix |
|---|
| 15.175.12.0/31 |
| 15.175.12.2/32 |
| 15.175.12.8/32 |
| 15.175.12.12/31 |

AGGREGATED ROUTING/FORWARDING TABLE
310

| $Y\_i$ | Sequence Begin | Sequence End |
|---|---|---|
| 1 | 15.175.12.0 | 15.175.12.2 |
| 2 | 15.175.12.8 | 15.175.12.8 |
| 3 | 15.175.12.12 | 15.175.12.13 |

ASSIGNED ADDRESS LIST
320

| $X\_i$ | Gap Begin | Gap End | Gap Size |
|---|---|---|---|
| 1 | 15.175.12.3 | 15.175.12.7 | 5 |
| 2 | 15.175.12.9 | 15.175.12.11 | 3 |
| 3 | 15.175.12.14 | 15.175.12.15 | 2 |

ADDRESS GAP LIST
330

ADDRESS GAP LIST 330

| X_i | Gap Begin | Gap End | Gap Size |
|---|---|---|---|
| 1 | 15.175.12.3 | 15.175.12.7 | 5 |
| 2 | 15.175.12.9 | 15.175.12.11 | 3 |
| 3 | 15.175.12.14 | 15.175.12.15 | 2 |

SUB-TREE GAP LIST 610

| Sub-tree Gap ID | X_i | Gap Begin | Gap End | Sub-tree Gap Size | Inclusive Gap Size |
|---|---|---|---|---|---|
| 1 | 1 | 15.175.12.3 | 15.175.12.3 | 1 | 5 |
| 2 | 1 | 15.175.12.4 | 15.175.12.7 | 4 | 5 |
| 3 | 2 | 15.175.12.9 | 15.175.12.9 | 1 | 3 |
| 4 | 2 | 15.175.12.10 | 15.175.12.11 | 2 | 3 |
| 5 | 3 | 15.175.12.14 | 15.175.12.15 | 2 | 2 |

METHOD AND APPARATUS FOR ASSIGNING IP ADDRESSES

FIELD OF THE INVENTION

The invention relates to the field of communication networks and, more specifically, to address assignment in mobile networks.

BACKGROUND OF THE INVENTION

In mobile networks, mobile nodes (MNs) can request dynamic home IP address assignment, based on their Network Access Identifiers (NAIs). The IP address is assigned by one of three entities, a home agent (HA), an Authorization, Authentication, Accounting (AAA) server, or a Dynamic Host Control Protocol (DHCP) server. When a new MN registers and is assigned an IP address, a routing entry is created in the routing/forwarding table in order to assign the appropriate route for any packets destined to the MN. When a MN leaves (deregisters/expires), the associated home IP address is released and the routing entry is removed from the routing/forwarding table. The routing entry points to an outgoing/destination interface, controlled by the HA, to which packets are sent.

As the number of MNs can be quite large (e.g., on the order of millions), the size of the routing/forwarding table can become unmanageably large if each route for each MN is stored individually. Additionally, the number of routing entries that can be stored on a per-interface basis is limited by the total amount of memory available. One technique used to mitigate such problems is to perform address aggregation on routing/forwarding tables for each destination interface. In this technique, only MNs that are registered (or permitted) are allowed to be represented in the routing/forwarding tables (i.e., no routes should be present for any MN that is not registered/permitted. Disadvantageously, however, due to the dynamic nature of the network (with MNs joining/leaving the network), address aggregation can become unwieldy because the address server assigns IP addresses to joining MNs sequentially while continuing to withdraw IP address from leaving MNs, resulting in a large number of holes in the IP address space available at the address server.

The problems of existing address aggregation can be seen from an example. As an example, assume that eight MNs join the network and are assigned IP addresses 10.1.2.0-10.1.2.7, which, using address aggregation, results in one routing table entry of 10.1.2.0/29. In this example, assuming that the MN assigned IP address 10.1.2.4 leaves the network, the routing table will need three routing entries to support the seven remaining MNs (i.e., 10.1.2.0/30, 10.1.2.6/31, 10.1.2.5/32). In this example, if another MN then joins the network, if a next sequential IP address is assigned (i.e., 10.1.2.9), the routing table will then need four entries to support eight MNs (i.e., the previous three, plus 10.1.2.9/32). Thus, from this example it may be seen that existing address aggregation schemes perform sub-optimally. The problem is worse in real networks which support a much larger numbers of MNs.

SUMMARY OF THE INVENTION

Various deficiencies in the prior art are addressed through invention of a method and apparatus for assigning an IP address to a mobile node (MN) from an IP address space represented using an address aggregation tree. A method includes receiving a request for an IP address for the MN, identifying each of a plurality of sub-tree gaps in the address aggregation tree, selecting one of the identified sub-tree gaps, and assigning an available IP address from the selected sub-tree gap to the MN. The sub-tree gaps of the address aggregation tree are identified using an algorithm that traverses the address aggregation tree. The selected one of the sub-tree gaps is selected based on respective sizes of the identified sub-tree gaps. The assigned IP address is communicated to the MN for use by the MN in accessing various services.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides improved IP address assignment resulting in significant reductions in routing/forwarding table size. The present invention utilizes properties of a trie-based representation of an IP address space (denoted as an address aggregation tree or address aggregation trie), assigning IP addresses from sub-tree gaps in the address aggregation tree in a manner tending to fill sub-trees of the address aggregation tree, thereby resulting in removal of filled portions of the address aggregation tree and, thus, resulting in a smaller routing/forwarding table requiring less storage space at the address server.

Figure 1:
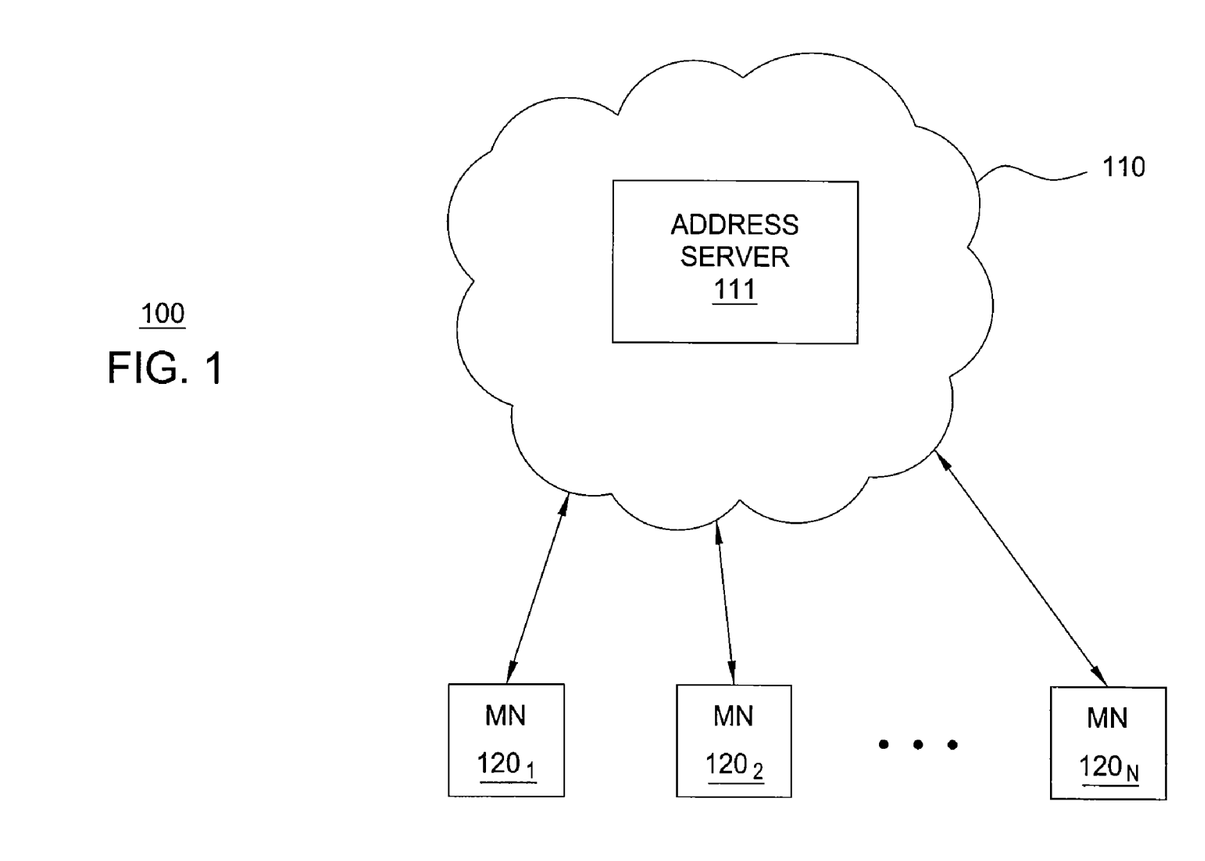
FIG. 1 depicts a high-level block diagram of a communication network architecture.

FIG. 1 depicts a high-level block diagram of a communication network architecture. Specifically, communication network architecture 100 includes a communication network (CN) 110 adapted for supporting communications for mobile nodes (illustratively, for a plurality of mobile nodes (MNs) 120$_1$-120$_N$ (collectively, MNs 120)). The CN 110 includes an address server (AS) 111 adapted for assigning IP addresses to MNs 120.

The CN 110 may include any IP-based network, such as the Internet or any other packet-based network utilizing IP. The CN 110 may support any mobility protocol, such as Mobile IP or any similar protocol that enables mobile nodes to roam while maintaining a permanent IP address. The CN 110 includes various routers, switches, and the like for routing information for MNs 120. The CN 110 includes servers and other network elements adapted for providing services to MNs 120.

The MNs 120 include mobile nodes capable of communicating over a packet-based network (illustratively, CN 110). The MNs 120 communicate over CN 110 for accessing and utilizing various services, such as voice services, data services, video services, multimedia services, and the like, as well as various combinations thereof. For example, MNs 120 may include laptops, mobile phones, and the like.

The AS 111 manages IP addresses for CN 110, performing IP address management functions for MNs 102. The AS 111 assigns IP addresses to MNs 120 when they join the network and withdraws IP addresses from MNs 120 when they leave the network. For example, AS 111 may be a Home Agent (HA), an Authentication, Authorization, Accounting (AAA) server, a Dynamic Host Configuration Protocol (DHCP) server, or any other network element(s) adapted for assigning IP addresses.

The AS 111 performs IP address assignment in accordance with the present invention. The AS 111, in response to a request from one of MNs 120, assigns an IP address to the MN 120. The AS 111 uses a trie-based greedy scheme whereby AS 111 identifies sub-tree gaps of an IP address space represented using an address aggregation tree, selects one of the identified sub-tree gaps, selects an available IP address from the selected sub-tree gap, and assigns the selected IP address to the MN 120.

The operation of AS 111 in performing address assignment in accordance with the present invention may be better understood with respect to FIG. 2-FIG. 7.

Figure 2:
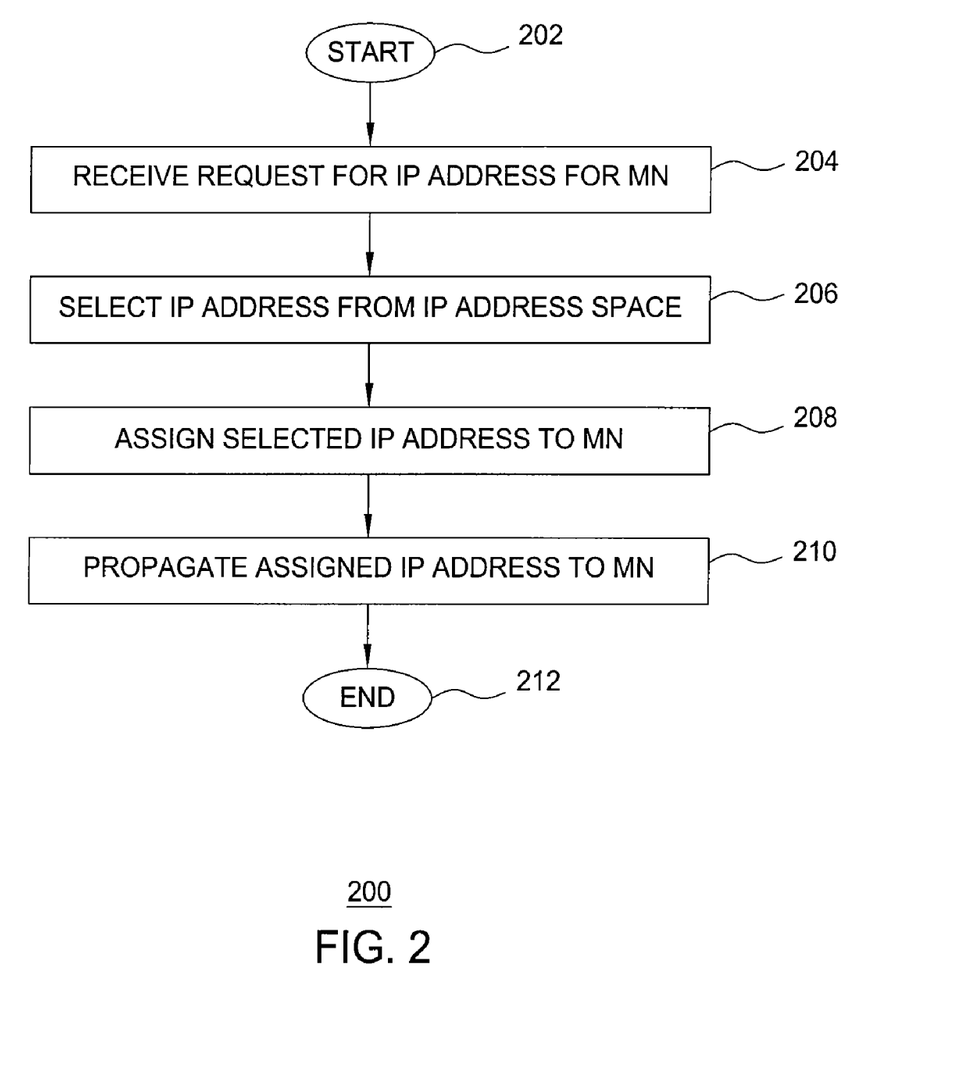
FIG. 2 depicts a method according to one embodiment of the present invention.

FIG. 2 depicts a method according to one embodiment of the present invention. Specifically, method 200 of FIG. 2 includes a method for assigning an IP address to a mobile node. Although depicted and described as being performed serially, at least a portion of the steps of method 200 of FIG. 2 may be performed contemporaneously, or in a different order than depicted and described with respect to FIG. 2. The method 200 begins at step 202 and proceeds to step 204.

At step 204, a request for an IP address is received. The request for the IP address is received at an address server adapted for serving the request for an IP address (e.g., a HA, an AAA server, a DHCP server, and the like). The request for an IP address is received from a MN (e.g., when the MN requests to be registered with the communication network), or from an agent of the MN responsible for requesting an address on behalf of the MN. The request for an IP address may be received in any form (e.g., a request to register with the network, a request for an IP address from the network, and the like).

At step 206, an IP address is selected from a set of available IP addresses. The set of available IP addresses includes IP addresses from one or more gaps in an IP address space. The address space is represented using an address aggregation tree (which is a trie-based representation of the IP address space). The IP address space may include all IP addresses managed by the address server or a subset of all IP addresses managed by the address server (e.g., on a per-interface basis or any other partitioning of the total IP address space of the address server). In accordance with the present invention, the IP address is selected from a sub-tree gap in the address aggregation tree.

At step 208, the selected IP address is assigned to the MN. The selected IP address may be assigned to the MN in any manner for assigning an IP address to a MN. At step 210, the assigned IP address is propagated to the MN. The assigned IP address may be propagated to the MN in any manner for providing an assigned IP address to the MN to which it is assigned. The MN may use the IP address to access various services, such as voice, data, multimedia, and the like, as well as various combinations thereof. At step 212, method 200 ends.

The present invention enables reductions in routing/forwarding table size by identifying sub-tree gaps in an IP address space represented using a binary trie (the address aggregation tree), selecting one of the identified sub-tree gaps, and assigning an available IP address from the selected sub-tree gap. The operation of the present invention in providing such functions may be better understood by first considering address management for an IP address space, including route aggregation techniques and representation of the IP address space using a binary trie, as depicted and described with respect to FIG. 3 and FIG. 4.

Figure 3:
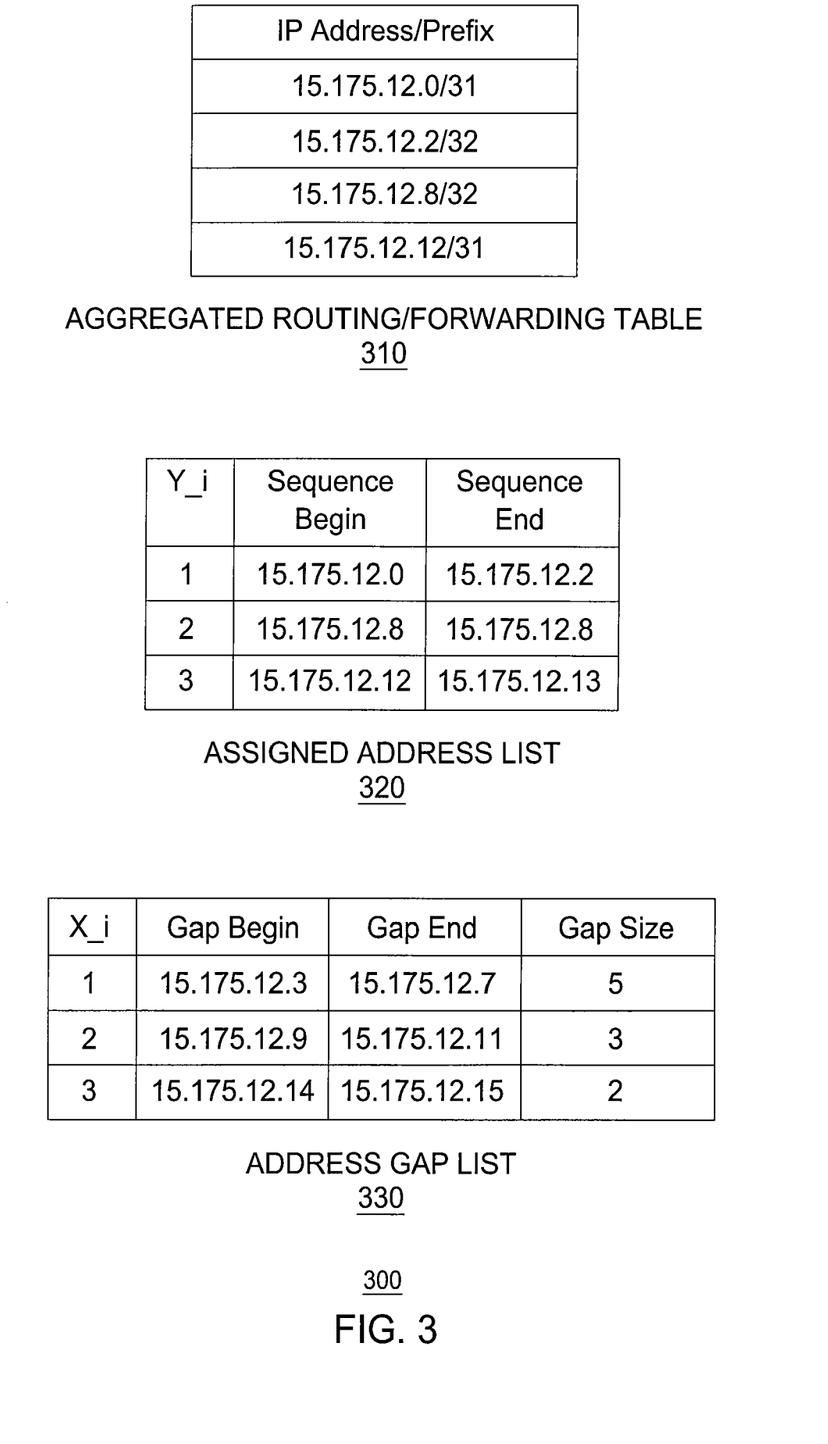
FIG. 3 depicts management of an address space for an interface.

FIG. 3 depicts address management for an interface. As depicted in FIG. 3, given a list of IP addresses being managed by an address server for a particular interface, assigned IP addresses (i.e., IP addresses currently being used by MNs) are maintained in an aggregated routing/forwarding table 310. Additionally, assigned IP addresses are maintained in an assigned address list 320 and available IP addresses (i.e., IP addresses currently available for use by MNs) are maintained in an address gap list 330. The entries of assigned address list 320 are denoted as $y\_1$, $y\_2$, $y\_3$, and so on. The entries of address gap list 330 are denoted as $x\_1$, $x\_2$, $x\_3$, and so on. For purposes of clarity, aggregated routing/forwarding table 310, assigned address list 320, and address gap list 330 are depicted with respect to an example.

As depicted in FIG. 3, the IP address space for the given interface includes IP addresses in a range from 15.175.12.0 through 15.175.12.15 (i.e., 16 total IP addresses), six of which are currently assigned to MNs: 15.175.12.0-15.175.12.2, 15.175.12.8, and 15.175.12.12-15.175.12.13. In a standard routing/forwarding table that does not use route aggregation, these six IP addresses would be represented using six entries. In an aggregated routing/forwarding table (illustratively, aggregated routing/forwarding table 310), however, these six IP addresses are represented using four entries: 15.175.12.0/31, 15.175.12.2/32, 15.175.12.8/32, and 15.175.12.12/31.

As depicted in FIG. 3, the entries of aggregated routing/forwarding table 310 correspond to three associated entries of the assigned address list 320: $y\_1$ is the range from 15.175.12.0-15.175.12.2, $y\_2$ is the range from 15.175.12.8-15.175.12.8, and $y\_3$ is the range from 15.175.12.12-15.175.12.13. The remaining, unassigned IP addresses are represented using three entries in the address gap list 330: $x\_1$ is the range from 15.175.12.3-15.175.12.7, $x\_2$ is the range from 15.175.12.9-15.175.12.11, and $x\_3$ is the range from 15.175.12.14-15.175.12.15. The address gap list 330 also includes the gap size for each of the gaps (5, 3, and 2, respectively, as depicted in FIG. 3).

An address server may store a routing/forwarding table in the form of a binary trie (denoted herein as an address aggregation tree, or as an address aggregation trie). A single trie represents an address space. Thus, since an address server may manage multiple addresses spaces, an address server may include multiple tries. In one embodiment, routing/forwarding tables may be stored on a per-interface basis, in which case a separate binary trie will be maintained for each interface. The present invention makes use of some rules associated with a binary trie.

There are some well-known rules associated with a binary trie. A leaf node is created in a binary trie only if the IP address corresponding to that leaf node is assigned to a MN. A leaf node is at level 0, its parent node is at level 1, and so on. The maximum number of leaf nodes under any node at level K in the binary trie is $2^K$. A non-leaf node in the binary trie has at least one leaf node in the sub-tree starting at the non-leaf node, otherwise the non-leaf node is deleted. If a sub-tree rooted at a non-leaf node in level K is full (i.e., it has $2^K$ leaves), then the entire sub-tree below the non-leaf node is deleted from the binary trie.

Figure 4:
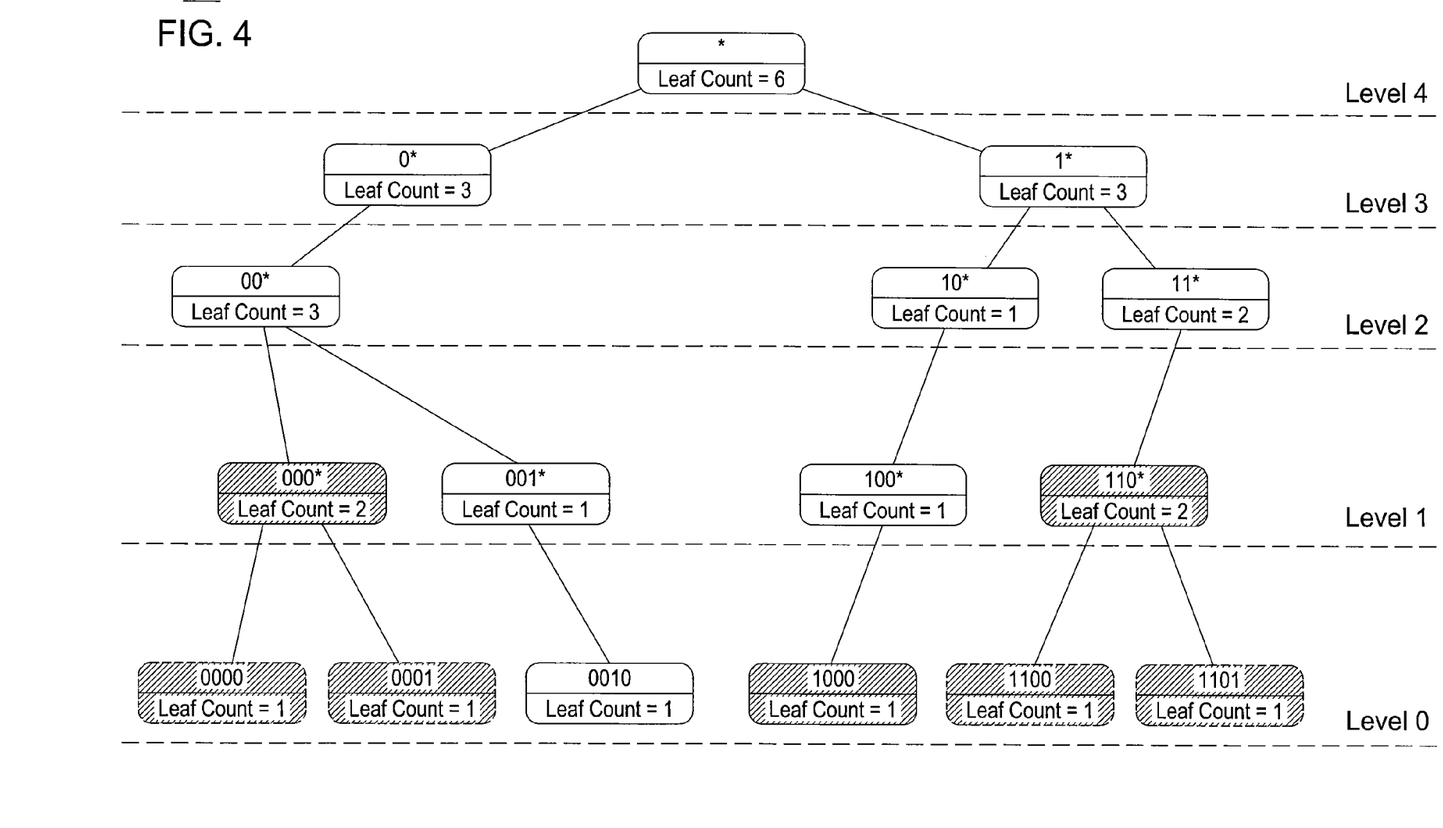
FIG. 4 depicts an address aggregation tree representing the address space of FIG. 3.

FIG. 4 depicts an address aggregation tree representing the routing/forwarding table of FIG. 3. As depicted in FIG. 4, address aggregation tree 400 includes five levels (denoted as levels 0 through 4). The address aggregation tree 400 includes six leaf nodes, corresponding to the six IP addresses assigned to MNs and represented in both routing/forwarding table 310 and assigned address list 320 of FIG. 3. For purposes of clarity in representing the routing/forwarding table of FIG. 3 as a tree, only the last four bits of the thirty-two bit IP addresses are depicted in FIG. 4. For purposes of clarity in describing properties of a binary trie, nodes of the tree which would be removed from the tree (i.e., collapsed in a manner for reducing the size of the routing table) are depicted using dashed lines.

As described herein, a non-leaf node in the tree has at least one leaf node in the sub-tree starting at the non-leaf node, otherwise the non-leaf node is deleted from the tree. For example, since none of the IP addresses ending in 01* have been assigned to MNs, there is no non-leaf node for 01* at level 2, there are no non-leaf nodes for 010* and 011* at level 1, and there are no leaf nodes for 0100, 0101, 0110, or 0111 at level 0 (i.e., none of these nodes are stored in address aggregation tree 400). Similarly, for example, since none of the IP addresses ending in 111* have been assigned to MNs, there is no non-leaf node for 111* at level 1, and there are no leaf nodes for 1110 or 1111 at level 0 (i.e., none of these nodes are stored in address aggregation tree 400).

As described herein, if a sub-tree rooted at a non-leaf node in level K is full (i.e., it has $2^K$ leaves), the entire sub-tree below the non-leaf node is deleted from the tree. For example, since both IP addresses for leaf nodes 0000 and 0001 are assigned, those leaf nodes can be removed from address aggregation tree 400 since they form a sub-tree that is full (i.e., these nodes would not exist in the real tree and are merely depicted here for purposes of clarity). Similarly, for example, since both IP addresses for leaf nodes 1100 and 1101 are assigned, those leaf nodes can be removed from address aggregation tree 400 since they form a sub-tree that is full (i.e., these nodes would not exist in the real tree and are merely depicted here for purposes of clarity).

Thus, from the description above, it is clear that not all nodes depicted in address aggregation tree 400 would exist in address aggregation tree 400 during an actual implementation of the present invention. As depicted in FIG. 4, root node (*), as well as nodes 0*, 00*, 000*, 001*, 0010, 1*, 10*, 100*, 1000, 11*, and 110*, would all exist in address aggregation tree 400 during an actual implementation. Thus, these nodes are all represented using solid-line boundaries. As depicted in FIG. 4, nodes 0000, 0001, 1100, and 1101, although depicted as being included in address aggregation tree 400, would not exist in address aggregation tree 400 during an actual implementation. Thus, these nodes are all represented using dashed-line boundaries.

In some IP address assignment schemes, IP addresses are assigned from gaps in the IP address space where the IP address space is represented using standard route aggregation. These address assignment schemes do not use a trie-based representation of the IP address space.

In one IP address assignment scheme, an IP address is assigned from the largest address gap (denoted as the largest gap assignment scheme). In this scheme, the x_i address gaps are sorted in descending order, the address gap having the largest associated gap size is selected as the address gap from which an IP address is assigned. In this scheme, the IP address may be assigned from either end of the gap (to prevent the creation of additional gaps). This scheme keeps the address gaps balanced in size and, thus, while the routing tables might not be very small, they won't be very large either (i.e., variance of the routing table sizes is small in this scheme).

The largest gap assignment scheme may also be inefficient because, as IP addresses are continually assigned, the largest gap size is constantly decreasing and, as a result, the address gap list may have to be resorted frequently and the identity of the address gap having the largest gap size will change frequently. This implies that the number of address gaps does not decrease for quite a while, thereby reducing the savings in routing table size. Thus, while this scheme eventually leads to a reduction in routing table sizes as the size of the largest address gap decreases, this scheme may lead to poor average case performance.

Using the largest gap assignment scheme, assuming two additional MNs request IP addresses (where aggregated routing/forwarding table 310 represents the current state IP address assignments at the time of the additional assignments), IP addresses of 15.175.12.3 and 15.175.12.4 may be assigned (where the addresses are assigned from the beginning of the largest address gap size). Although an updated address aggregation tree is omitted (since a tree is not used in the largest gap assignment scheme), the assignment of these two IP addresses, based on the largest gap assignment scheme, would result in an updated tree having 12 nodes which must be stored. This would also result in an updated aggregated routing/forwarding table having 4 entries and an updated address gap list having 3 entries.

In another IP address assignment scheme, an IP address is assigned from the smallest address gap (denoted as the smallest gap assignment scheme). In this scheme, the x_i address gaps are sorted in ascending order, and the address gap having the smallest associated gap size is selected as the address gap from which an IP address is assigned. In this scheme, the smallest address gaps are closed quickly and, thus, address aggregation can reduce the number of routing entries in the routing table for each interface. This scheme, however, fails to consider the nature of the address gaps and, thus, fails to significantly reduce the routing table sizes either.

Using the smallest gap assignment scheme, assuming two additional MNs request IP addresses (where aggregated routing/forwarding table 310 represents the current state IP address assignments at the time of the additional assignments), IP addresses of 15.175.12.14 and 15.175.12.15 would be assigned. Although an updated tree is omitted (since a tree is not used in the smallest gap assignment scheme), the assignment of these two IP addresses, based on the smallest gap assignment scheme, would result in an updated tree having 11 nodes which must be stored. This would also result in an updated aggregated routing/forwarding table having 4 entries and an updated address gap list having 2 entries.

The smallest gap assignment scheme assigns IP addresses to MNs such that the smallest gaps in the address space are filled out first; however, this scheme fails to account for the structure of the tree which represents the IP address space. Specifically, when an address gap spans two sub-trees in the tree, selection of IP addresses irrespective of the sub-tree gaps results in sub-optimal address aggregation and, thus, sub-optimal reduction in the size of the associated routing/forwarding table. The present invention determines which IP address, if assigned to a MN on a particular interface, will result in the largest reduction in the size of the routing/forwarding table by accounting for sub-tree gaps in a trie-based representation of the IP address space (i.e., by accounting for sub-tree gaps in the address aggregation tree).

The present invention implements a trie-based greedy scheme, in which each address gap that spans multiple sub-trees is split into multiple associated sub-tree gaps. In the trie-based greedy scheme, the sub-tree gaps are identified, and one of the identified sub-tree gaps is selected as the sub-tree gap from which an IP address is assigned in response to a request from a MN. By enabling identification of sub-tree gaps and assignment of IP addresses from sub-tree gaps, the trie-based greedy scheme enables assignment of IP addresses to be performed in a manner for aggregating IP addresses within sub-trees of the address aggregation tree (i.e., for filling up sub-trees in the address aggregation tree in the most useful manner).

The trie-based greedy scheme utilizes the property of a binary trie in which, if a sub-tree rooted at a non-leaf node in level K is full (i.e., it has $2^K$ leaves), the entire sub-tree below the non-leaf node is deleted from the trie, as described hereinabove. As such, by assigning IP addresses in a manner for aggregating IP addresses within sub-trees of the address aggregation tree, the present invention thereby assigns IP addresses in a manner for filling sub-tree gaps such that the sub-tree gaps may be removed from the address aggregation tree, thereby reducing the size of the address aggregation tree and, thus, the reducing the size of the aggregated routing/forwarding table. Thus, the trie-based greedy scheme provides an improved method of IP address assignment which results in a smaller aggregated routing/forwarding table requiring less memory to store.

Figure 5:
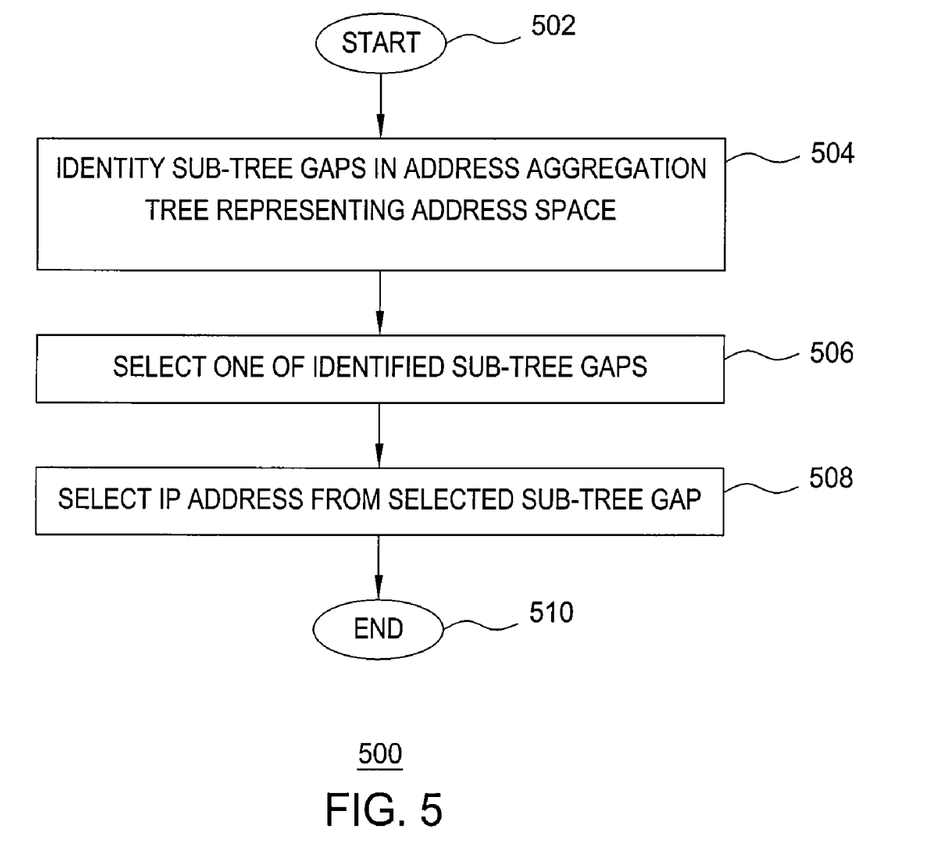
FIG. 5 depicts a method according to one embodiment of the present invention.

A method according to one embodiment of the trie-based greedy scheme is depicted and described with respect to FIG. 5.

FIG. 5 depicts a method according to one embodiment of the present invention. Specifically, method 206 of FIG. 5 includes a method for selecting an IP address from an IP address space. Although depicted and described as being performed serially, at least a portion of the steps of method 206 of FIG. 5 may be performed contemporaneously, or in a different order than depicted and described with respect to FIG. 5. The method 206 begins at step 502 and proceeds to step 504.

As step 504, sub-tree gaps are identified from the address aggregation tree (i.e., the binary trie) representing the address space. The address aggregation tree representing the address space may be updated as IP addresses are assigned and withdrawn within the address space represented by the address aggregation tree, such that the address aggregation tree always provides the most recent snapshot of IP address assignment for that address space. The sub-tree gaps of an address aggregation tree may be identified in a number of ways.

In one embodiment, the sub-tree gaps of an address aggregation tree may be identified by traversing the address aggregation tree using a gap computation algorithm. In one such embodiment, the gap computation algorithm may be a recursive gap computation algorithm.

In one such embodiment, the recursive gap computation algorithm operates using a recursive function (denoted as compute_sub-tree-_gap) which takes as input two variables: (1) a parent node variable (denote as PNODE) and (2) a variable indicative of the current level within the address aggregation tree (denoted as LEVEL), where the root node is considered to be LEVEL=N and the leaf nodes are considered to be LEVEL=0. Thus, recursive function compute_sub-tree-_gap may be represented as compute_sub-tree-_gap (NODE, LEVEL).

The recursive gap computation algorithm begins by setting NODE=root and setting LEVEL=N (i.e., the recursive gap computation algorithm begins at the root node and traverses the address aggregation tree using calls to recursive function compute_sub-tree-_gap (NODE, LEVEL), where recursive function compute_sub-tree-_gap (NODE, LEVEL) is implemented according to the following pseudo-code:

---

1. If LEAF_COUNT = $2^{LEVEL}$, then RETURN (i.e., control is returned to the calling function). This means that the sub-tree rooted at NODE is full.
2. Let LNODE = left-branch child node of NODE and RNODE = right-branch child node of NODE.
 3a. If LNODE exists (in the address aggregation tree), compute_sub-tree_gap(LNODE, LEVEL −1).
 3b. If LNODE does not exist (in the address aggregation tree), add IP addresses represented by LNODE to the sub-tree gap list.
 4a. If RNODE exists (in the address aggregation tree), compute_sub-tree_gap(RNODE, LEVEL −1).
 4b. If RNODE does not exist (in the address aggregation tree), add IP addresses represented by RNODE to the sub-tree gap list.
5. RETURN (i.e., control is returned to the calling function).

---

Using this recursive gap computation algorithm (or any other similar algorithm), each of the sub-tree gaps of the address aggregation tree is identified.

The sub-tree gaps of an address aggregation tree may be identified in various other ways. In another embodiment, for example, the sub-tree gaps of an address aggregation tree may be identified using an iterative algorithm (e.g., having a nested while ( ) loop structure).

The sub-tree gaps of an address aggregation tree may be managed in many ways.

The identified sub-tree gaps may be maintained in a sub-tree gap list. The sub-tree gap list includes a list of identified sub-tree gaps, and may include information which characterizes each identified sub-tree gap, such as the range of IP addresses available in the sub-tree gap, the size of the sub-tree gap, the mapping of the sub-tree gap to the associated gap in the address space, and the like, as well as various combinations thereof.

Figure 6:
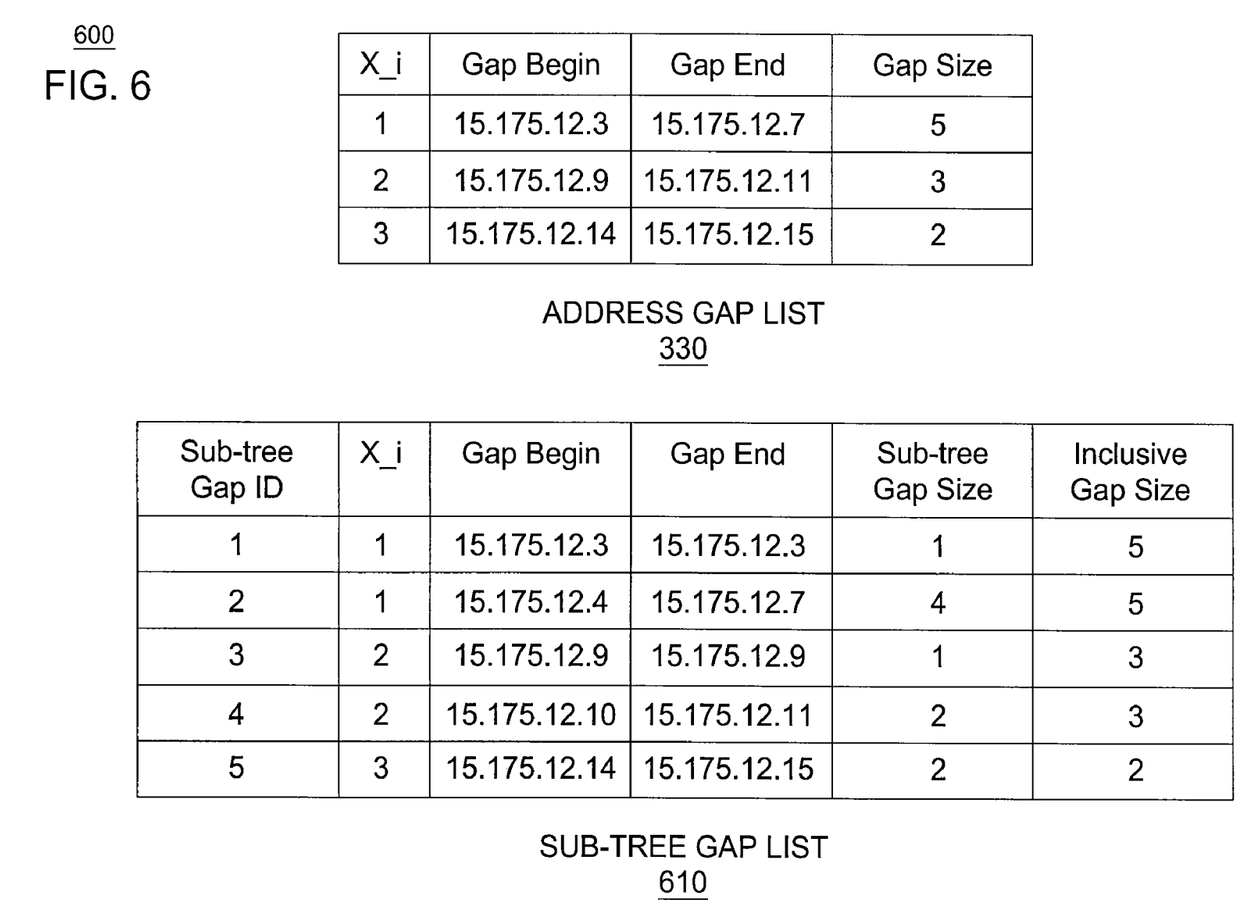
FIG. 6 depicts a sub-tree gap list for the address aggregation tree of FIG. 4.

An exemplary sub-tree gap list (including sub-tree gaps identified from address aggregation tree 400 depicted and described in FIG. 4) is depicted and described with respect to FIG. 6.

At step 506, one of the identified sub-tree gaps is selected. The selected one of the identified sub-tree gaps is selected in a manner for filling existing sub-tree gaps such that nodes of the address aggregation tree that represents the address space may be removed from the address aggregation tree, thereby reducing the size of the address aggregation tree and, thus, reducing the size of the associated aggregated routing/forwarding table. The selected one of the identified sub-tree gaps may be selected in a number of ways.

In one embodiment, in which identified sub-tree gaps are maintained in a sub-tree gap list, selection of one of the sub-tree gaps from which the IP address is assigned is performed by sorting the identified sub-tree gaps of the sub-tree gap list in order according to the respective sub-tree gap sizes of the sub-tree gaps (i.e., based on the sub-tree gap size field) and selecting the sub-tree gap having the smallest sub-tree gap size.

In one further embodiment, in which identified sub-tree gaps are maintained in a sub-tree gap list, the identified sub-tree gaps of the sub-tree gap list may be further sorted in order (within each group of identical sub-tree gap sizes) according to the size of the address gap to which each of the sub-tree gaps belongs (i.e., based on the inclusive gap size field). In this embodiment, the sub-tree gap having the smallest address gap size is selected.

The selected one of the identified sub-tree gaps may be selected in various other ways which tend to reduce the size of the address aggregation tree and, thus, reduce the size of the associated aggregated routing/forwarding table.

At step 508, an available IP address is selected from the selected sub-tree gap. The IP address is selected from the selected sub-tree gap in a manner for preventing any additional gaps from being formed in the address space. The selected IP address is the IP address selected to be assigned to the mobile node requesting an IP address, as depicted and described with respect to FIG. 2.

At step 510, method 206 ends.

Although omitted for purposes of clarity in describing IP address assignment processing, an address aggregation tree representing an IP address space may be updated in response to each IP address event (i.e., in response to each assignment of an IP address to a MN and each withdrawal of IP address from a MN).

For example, where an IP address is assigned for use by a MN, if the IP address assignment results in a sub-tree being filled, the appropriate nodes of the address aggregation tree may be removed from the address aggregation tree, thereby realizing the reduction in the size of the address aggregation tree and, thus, the aggregated routing/forwarding table.

For example, where an IP address is withdrawn from use by a MN, if the IP address assignment results in a sub-tree being unfilled, the appropriate nodes of the address aggregation tree may be added to the address aggregation tree, thereby increasing the size of the address aggregation tree and, thus, the aggregated routing/forwarding table.

FIG. 6 depicts an exemplary sub-tree gap list generated using the address aggregation tree of FIG. 4 and the address gap list of FIG. 3.

As depicted in FIG. 6 (and previously depicted and described in FIG. 3), address gap list 330 includes three entries representing unassigned IP addresses (and including the associated gap size): x_1 is the range from 15.175.12.3-15.175.12.7, x_2 is the range from 15.175.12.9-15.175.12.11, and x_3 is the range from 15.175.12.14-15.175.12.15. As can be seen from address aggregation tree 400 of FIG. 4, the first address gap x_1 spans two sub-trees of address aggregation tree 400 (illustratively, it spans the sub-tree rooted at 00* and the sub-tree rooted at 01*), the second address gap x_2 spans two sub-trees of address aggregation tree 400 (illustratively, it spans the sub-tree rooted at 100* and the sub-tree rooted at 101*), and the third address gap x_3 does not span multiple sub-trees.

As depicted in FIG. 6, a sub-tree gap list 610 is created by traversing address aggregation tree 400 of FIG. 4 to identify any sub-tree gaps. The identified sub-tree gaps are stored in sub-tree gap list 610. The sub-tree gap list 610 includes information characterizing each of the identified sub-tree gaps. The sub-tree gap characterization information may include information about the sub-tree gaps, and may also include information about address gaps with which the identified sub-tree gaps are associated (e.g., including a mapping of each of the sub-tree gaps to the address gap with which it is associated). Thus, sub-tree gap list 610 may be generated by traversing address aggregation tree 400 of FIG. 4, as well as using information identified from address gap list 330 of FIG. 3.

As depicted in FIG. 6, sub-tree gap list 610 includes fields in which such characterizing information is stored. Specifically, sub-tree gap list 610 of FIG. 6 includes a sub-tree gap identifier field, a corresponding address gap identifier field (x_i), a gap begin field and gap end field, a sub-tree gap size field, and an inclusive gap size field (i.e., the size of the address gap with which the sub-tree gap is associated). Although depicted and described with respect to a specific fields and a specific structure, the identified sub-tree gaps may be organized in various other ways, and may include less or more (or different) information organized using less or more (or different) fields.

As depicted in sub-tree gap list 610, the first address gap x_1 (which has an inclusive gap size of five) includes two associated sub-tree gaps (a first sub-tree gap including 15.175.12.3 having a sub-tree gap size of one and a second sub-tree gap including 15.175.12.4 through 15.175.12.7 having a sub-tree gap size of four), the second address gap x_2 (which has an inclusive gap size of three) includes two associated sub-tree gaps (a third sub-tree gap including 15.175.12.9 having a sub-tree gap size of one and a fourth sub-tree gap including 15.175.12.10 through 15.175.12.11 having a sub-tree gap size of two), and the third address gap x_3 (which has an inclusive gap size of two) includes one sub-tree gap (a fifth sub-tree gap including 15.175.12.14 through 15.175.12.15).

Using the trie-based greedy scheme of the present invention, in one embodiment sub-tree gap list 610 may be sorted on one or more parameters in order to select one of the sub-tree gaps from which an IP address is assigned in response to a request from a mobile node. In one embodiment, for example, the sub-tree gap list 610 of FIG. 6 would be sorted such that the order of the sub-tree gaps (identified according to sub-tree gap identifier) is 1, 3, 4, 5, 2. In one further embodiment, for example, the sub-tree gap list 610 of FIG. 6 would be further sorted such that the order of the sub-tree gaps (identified according to sub-tree gap identifier) is 3, 1, 4, 5, 2.

Figure 7:
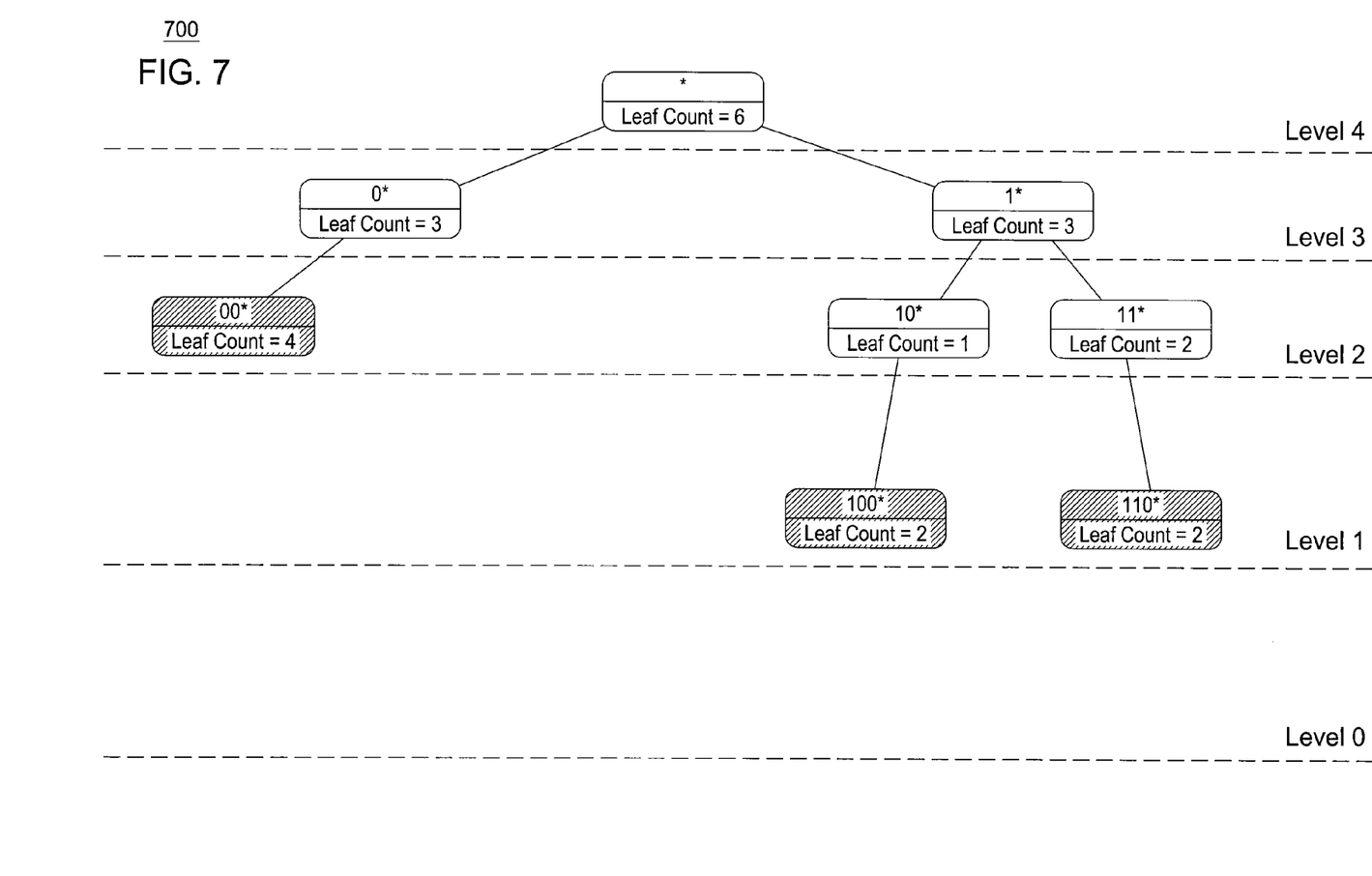
FIG. 7 depicts the address aggregation tree of FIG. 4 after additional IP addresses are assigned based on the sub-tree gap list of FIG. 6.

FIG. 7 depicts the address aggregation tree of FIG. 4 following assignment of two additional IP addresses based on the sub-tree gap list of FIG. 6. As depicted in FIG. 7, use of the trie-based greedy scheme of the present invention results in assignment of IP addresses 15.175.12.9 (1001) and 15.175.12.3 (0011).

Upon assignment of IP address 15.175.12.9, the sub-tree rooted at node 100* is complete, and, thus, nodes 1000 and 1001 may be removed from the address aggregation tree. Similarly, upon assignment of IP address 15.175.12.3, the sub-tree rooted at node 001* is complete, and, thus, that sub-tree can be removed from the address aggregation tree; and, further, since the sub-tree rooted at node 000* is also complete, nodes 000* and 001* may also be removed from the address aggregation tree, leaving only parent node 00* in that branch of the address aggregation tree. As such, in response to each IP address assignment, the number of nodes in the address aggregation tree is reduced and, thus, the size of the aggregated routing/forwarding table is reduced.

As described previously, assignment of two additional IP addresses by an address server using a largest gap assignment scheme would result in a address aggregation tree having 12 nodes, and assignment of two additional IP addresses by an address server using a smallest gap assignment scheme would result in an address aggregation tree having 11 nodes. By contrast, assignment of two additional IP addresses by an address server using the trie-based greedy scheme would result in an address aggregation tree having 8 nodes, thereby providing significant savings in the size of the aggregated routing/forwarding table, as compared to the largest gap and smallest gap assignment schemes.

Thus, FIG. 7 clearly illustrates, through an example, that the trie-based greedy scheme of the present invention provides a significant improvement over existing IP address assignment algorithms in terms of aggregated routing/forwarding table size.

Although omitted for purposes of clarity, address aggregation may be performed at any time. In one embodiment, address aggregation is performed periodically. In one embodiment, address aggregation is performed after a status change of a mobile node. Thus, address aggregation may be performed periodically and/or aperiodically.

Although primarily depicted and described herein with respect to assigning IP address to mobile nodes in a mobility network implemented using Mobile IP, the address assignment scheme of the present invention may be implemented any mobility network using any mobility scheme. Although primarily depicted and described herein with respect to assigning IP address to mobile nodes in a mobility network, the address assignment scheme of the present invention may be implemented in any network.

Although primarily depicted and described with respect to 32-bit IP addresses, the address assignment scheme of the present invention may be implemented for assigning IP addresses having different sizes. Although primarily depicted and described with respect to assigning IP addresses, the address assignment scheme of the present invention may be implemented for assigning other types of addresses.

Although primarily depicted and described herein with respect to assignment of addresses from a single address range, the present invention may also be used in cases where multiple non-overlapping address ranges are used to assign addresses to MNs. In such embodiments, each address range may be represented using a separate tree (i.e., separate binary trie).

Figure 8:
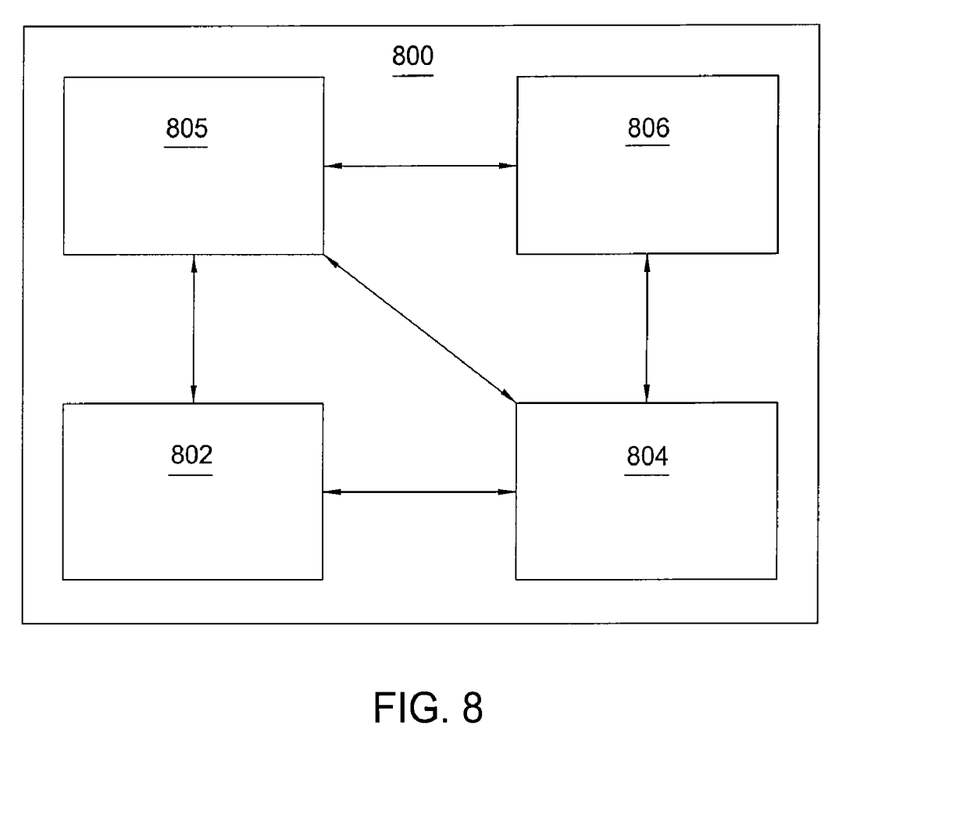
FIG. 8 depicts a high-level block diagram of a general-purpose computer suitable for use in performing the functions described herein.

FIG. 8 depicts a high-level block diagram of a general-purpose computer suitable for use in performing the functions described herein. As depicted in FIG. 8, system 800 comprises a processor element 802 (e.g., a CPU), a memory 804, e.g., random access memory (RAM) and/or read only memory (ROM), an address assignment module 805, and various input/output devices 806 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present address assignment process 805 can be loaded into memory 804 and executed by processor 802 to implement the functions as discussed above. As such, address assignment process 805 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for assigning an IP address to a mobile node (MN) from an IP address space represented using an address aggregation tree, comprising:
   receiving a request for an IP address for the MN;
   identifying each of a plurality of sub-tree gaps in the address aggregation tree, each of the sub-tree gaps comprising at least one IP address available for assignment to the MN;
   selecting one of the identified sub-tree gaps, wherein the selected one of the sub-tree gaps is selected according to respective sub-tree gap sizes of the identified sub-tree gaps, wherein the selected sub-tree gap comprises one of the sub-tree gaps having a smallest sub-tree gap size, wherein, when at least two of the plurality of sub-tree gaps have the same smallest sub-tree gap size, the selected sub-tree gap comprises one of the at least two sub-tree gaps having a smallest address space gap size; and
   assigning one of the at least one available IP address of the selected sub-tree gap to the MN.

2. A method for assigning an IP address to a mobile node (MN) from an IP address space represented using an address aggregation tree, comprising:
   receiving a request for an IP address for the MN;
   identifying each of a plurality of sub-tree gaps in the address aggregation tree, each of the sub-tree gaps comprising at least one IP address available for assignment to the MN;
   selecting one of the identified sub-tree gaps;
   assigning one of the at least one available IP address of the selected sub-tree gap to the MN; and
   in response to a determination that assignment of the available IP address fills a sub-tree in which the selected one of the sub-tree gaps is located, removing the sub-tree from the address aggregation tree.

3. The method of claim 2, wherein identifying the plurality of sub-tree gaps in the address aggregation tree comprises:
   traversing the address aggregation tree using an algorithm to identify each of the plurality of sub-tree gaps.

4. The method of claim 2, wherein each sub-tree gap comprises a gap in the IP address space that is located within a single sub-tree of the address aggregation tree.

5. The method of claim 2, wherein the selected sub-tree gap is selected in a manner tending to fill a largest sub-tree of the address aggregation tree first.

6. The method of claim 2, further comprising:
   propagating the assigned IP address toward the MN.

7. The method of claim 2, wherein the plurality of sub-tree gaps in the address aggregation tree are identified using a sub-tree gap list generated using the address aggregation tree.

8. The method of claim 7, wherein, for each of the sub-tree gaps, the sub-tree gap list comprises:
   an indication of the at least one IP address of the sub-tree gap; and
   a sub-tree gap size of the sub-tree gap.

9. An apparatus for assigning an IP address to a mobile node (MN) from an IP address space represented using an address aggregation tree, comprising:
- means for receiving a request for an IP address for the MN;
- means for identifying each of a plurality of sub-tree gaps in the address aggregation tree, each of the sub-tree gaps comprising at least one IP address available for assignment to the MN;
- means for selecting one of the identified sub-tree gaps, wherein the selected one of the sub-tree gaps is selected according to respective sub-tree gap sizes of the identified sub-tree gaps, wherein the selected sub-tree gap comprises one of the sub-tree gaps having a smallest sub-tree gap size, wherein, when at least two of the plurality of sub-tree gaps have the same smallest sub-tree gap size, the selected sub-tree gap comprises one of the at least two sub-tree gaps having a smallest address space gap size; and
- means for assigning one of the at least one available IP address of the selected sub-tree gap to the MN.

10. An apparatus for assigning an IP address to a mobile node (MN) from an IP address space represented using an address aggregation tree, comprising:
- means for receiving a request for an IP address for the MN;
- means for identifying each of a plurality of sub-tree gaps in the address aggregation tree, each of the sub-tree gaps comprising at least one IP address available for assignment to the MN;
- means for selecting one of the identified sub-tree gaps;
- means for assigning one of the at least one available IP address of the selected sub-tree gap to the MN; and
- means for removing, from the address aggregation tree, a sub-tree in which the selected one of the sub-tree gaps is located, wherein the sub-tree is removed in response to a determination that assignment of the available IP address fills the sub-tree in which the selected one of the sub-tree gaps is located.

11. The apparatus of claim 10, wherein the means for identifying the plurality of sub-tree gaps in the address aggregation tree comprises:
- means for traversing the address aggregation tree using an algorithm to identify each of the plurality of sub-tree gaps.

12. The apparatus of claim 10, wherein each sub-tree gap comprises a gap in the IP address space that is located within a single sub-tree of the address aggregation tree.

13. The apparatus of claim 10, wherein the selected sub-tree gap is selected in a manner tending to fill a largest sub-tree of the address aggregation tree first.

14. The apparatus of claim 10, further comprising:
- means for propagating the assigned IP address toward the MN.

15. A non-transitory computer-readable storage medium storing a software program, that, when executed by a computer, causes the computer to perform a method for assigning an IP address to a mobile node (MN) from an IP address space represented using an address aggregation tree, the method comprising:
- receiving a request for an IP address for the MN;
- identifying each of a plurality of sub-tree gaps in the address aggregation tree, each of the sub-tree gaps comprising at least one IP address available for assignment to the MN;
- selecting one of the identified sub-tree gaps;
- assigning one of the at least one available IP address of the selected sub-tree gap to the MN; and
- in response to a determination that assignment of the available IP address fills a sub-tree in which the selected one of the sub-tree gaps is located, removing the sub-tree from the address aggregation tree.

* * * * *